United States Patent [19]
Barris et al.

[11] Patent Number: 5,616,171
[45] Date of Patent: Apr. 1, 1997

[54] PULSE JET FILTER CLEANING SYSTEM

[75] Inventors: Marty A. Barris, Lakeville; Thomas M. Weik, Deephaven; Kelly C. Robertson, Rosemont; Donald R. Monson, W. St. Paul; Jim C. Rothman, Burnsville; Pete A. Betts, Osakis, all of Minn.

[73] Assignee: Donaldson Company, Inc., Minneapolis, Minn.

[21] Appl. No.: 550,283

[22] Filed: Oct. 30, 1995

Related U.S. Application Data

[63] Continuation of Ser. No. 178,873, Jan. 7, 1994, abandoned.

[51] Int. Cl.⁶ .................................................. B01D 46/04
[52] U.S. Cl. .......................... 95/280; 55/267; 55/302; 55/466; 55/DIG. 10
[58] Field of Search ................ 95/278–280; 55/302, 55/466, DIG. 10, DIG. 30, 267

[56] References Cited

U.S. PATENT DOCUMENTS

| | | | |
|---|---|---|---|
| 2,731,107 | 1/1956 | Hersey, Jr. | 55/302 X |
| 3,060,663 | 10/1962 | Morris et al. | 55/302 |
| 3,377,783 | 4/1968 | Young | 55/302 |
| 3,410,056 | 11/1968 | Reinauer | 95/280 |
| 3,487,609 | 1/1970 | Caplan | 55/302 X |
| 3,648,442 | 3/1972 | Bourne | 55/302 X |
| 4,218,227 | 8/1980 | Frey | 55/302 |
| 4,247,310 | 1/1981 | Borst | 95/279 |
| 4,331,459 | 5/1982 | Copley | 95/280 X |
| 4,359,330 | 11/1982 | Copley | 95/280 X |
| 4,395,269 | 7/1983 | Schuler | 55/302 |
| 4,475,934 | 10/1984 | Kordas | 55/302 |
| 4,544,389 | 10/1985 | Howeth | 55/302 |
| 4,690,700 | 9/1987 | Howeth | 55/302 |
| 4,875,335 | 10/1989 | Arai et al. | 60/274 |
| 5,123,243 | 6/1992 | Baddour | 60/274 |
| 5,253,476 | 10/1993 | Levendis et al. | 60/279 |
| 5,256,175 | 10/1993 | Zievers et al. | 55/302 |
| 5,261,934 | 11/1993 | Shutic et al. | 95/280 |
| 5,328,492 | 7/1994 | Zievers et al. | 55/302 |

FOREIGN PATENT DOCUMENTS 2097283  11/1982  United Kingdom.

Primary Examiner—Robert H. Spitzer
Attorney, Agent, or Firm—Merchant, Gould, Smith, Edell, Welter & Schmidt

[57] ABSTRACT

A filter-cleaning apparatus utilizes pulsed air to remove matter collected on a first surface of a filter. Reverse flow loosens the material which is collected in a hopper on the upstream side of the filter. The collected matter may then be combusted in the hopper so that the amount of material collected is minimized. The pulses are directed at the filter with a controlled shape and time to optimize reverse pulsing. Pulsing occurs while the thermal exhaust flow continues so that operation of the engine is not interrupted. A number of valves may be utilized to clean one or more filters.

15 Claims, 6 Drawing Sheets

PULSE JET FILTER CLEANING SYSTEM

This is a continuation of application Ser. No. 08/178,873, filed Jan. 7, 1994, now abandoned.

BACKGROUND OF THE INVENTION

1. Field of the Invention

The present invention relates to a method and apparatus for cleaning loaded engine exhaust filter elements and disposing of the loosened particulate material.

2. Description of the Prior Art

Many methods and devices for cleaning loaded air filters are known. The present invention provides a method and apparatus for cleaning loaded air filters from an engine exhaust stream which combusts the soot and other trapped material without interrupting normal exhaust flow.

Prior methods for cleaning air filters fail to dispose of loosened particulate in a satisfactory manner. Ceramic type filters must undergo exposure to extreme heat in order to burn off the trapped particulate matter. However, this requires expensive filters which are able to withstand the high temperatures. This method limits the types of filters which may be used. This method also requires that the filter be fitted directly to a heater element in order to combust the trapped materials.

Other filters are removed and replaced when the filter becomes loaded. However, replacing filters can add greatly to the operational costs. In addition, the filters are difficult to handle as the soot is hazardous and difficult to contain when the filter is removed. Disposal of the soot requires extremely careful handling.

Methods of providing a reverse blast of air require stopping the main air flow while the reverse blast is being delivered. This interruption of normal flow decreases the efficiency of the engine and requires more complicated control devices.

Although vehicles having air brakes and other types of equipment may come equipped with accumulators to store pressurized air, all devices may not have accumulators. Therefore reverse flow cleaners have required a separate pressure tank to supply the pressurized air for a reverse flow. Such additional containers are typically very large, requiring an additional amount of space.

U.S. Pat. No. 4,218,227 to Frey and assigned to Donaldson Company, Inc., assignee of the present application, shows a Dust Collector. The collector utilizes sixteen pleated filter elements. A reverse blast is utilized to clean the elements, but the pleated filter elements which are being cleaned must be taken off line. This requires a sufficient number of elements to allow some of the elements to be taken off line for cleaning.

U.S. Pat. No. 4,395,269 to Schuler and assigned to Donaldson Company, Inc., assignee of the present application, shows a Compact Dust Filter Assembly. A number of pleated filter elements having a plurality of chambers are cleaned with a reverse pulse jet. The pleated filter elements are angled downwardly to utilize gravity to aid in particle collection.

U.S. Pat. No. 5,123,243 to Baddour shows a Method and Apparatus for Trapping and Incinerating Particulate Matter Found in Diesel Engine Exhaust. Exhaust flow is interrupted and a reverse pulse is directed at the filter while the flow is stopped. Loosened particulate matter is transported to the engine intake whereat the particulate matter is combusted.

It can be seen then, that an improved method and apparatus are needed for cleaning exhaust air filters with a reverse surge of air. It can be appreciated that such a method should not create an excessive backpressure on the engine and that it is preferred that such a method does not interrupt the exhaust flow from the engine. Such a method and apparatus should not require an additional large pressure tank to provide the reverse flow. It can further be appreciated that such a method and apparatus be able to safely retain and dispose of loosened particulate material from the filter. The present invention addresses these and other problems associated with cleaning loaded filters with a reverse blast of air.

SUMMARY OF THE INVENTION

The present invention is directed to a pulse jet cleaning system, such as may be used to clean soot from air filters in an exhaust system. According to the present invention, reverse pulses of air are directed through filters to loosen debris from the upstream side of the filter. However, the pulsing occurs while the normal flow through the air filter continues. In this manner, interruption of engine operation and/or build-up of excess backpressure are avoided.

As pulsing occurs, the material which has been trapped on the upstream side of the filter is loosened and blown slightly upstream. The incoming flow is directed downward just before engaging the filter, so that gravity and the normal flow push the loosened material downward where it can be collected in a hopper. If the loosened material is combustible, the hopper may be equipped with a heater so that the collected material can be burned. The loosened material can contain a small portion of ash, which remains after the burning stage. In this manner, the hopper fills with ash at a much slower rate than if it filled with the collected material.

To optimize effectiveness of the pulses, the shape, length and pressure of the pulse can all be controlled and varied. In this manner, complete coverage of the area of the filter is obtained. In addition, it has been found that if the pulses are directed in a series of pulses of shorter duration rather than a single longer pulse, effectiveness is also increased.

The pulse may be shaped by a diverter cone which is placed proximate the nozzle releasing the air pulse. In this manner, as the pulse is spread outward, it is contained and shaped by the nozzle and directed over the entire area of the filter. Shaping of the pulse improves filter coverage, thereby increasing pulsing efficiency.

The system utilizes an accumulator tank to store compressed air for pulsing. In one embodiment, the pulsing valves are situated within the tank so that the air is supplied directly to the valves by simply opening up a port on the valve. The valves may also be arranged with a number of valves serving each filter to cover the surface area of the outlet side of the filter. In this manner, the air pulses generated by each valve slightly overlap to cover the area of the filter so that a diverter cone is not necessary.

A microprocessor controller monitors a number of variables including pressure in the tank, backpressure in the exhaust system, and engine speed, to control the pulse rate. In this manner, as vehicle speed varies, the rate of pulsing may also be increased or decreased so that cleaning and efficiency are maximized. The controller also varies valving for supplying air to the system's accumulator for a compressor which supplies air. The heater may also be cycled on and off to conserve energy and wear on equipment.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, wherein like reference letters and numerals indicate corresponding elements throughout the several views.

DETAILED DESCRIPTION OF THE PREFERRED EMBODIMENT(S)

Figure 1:
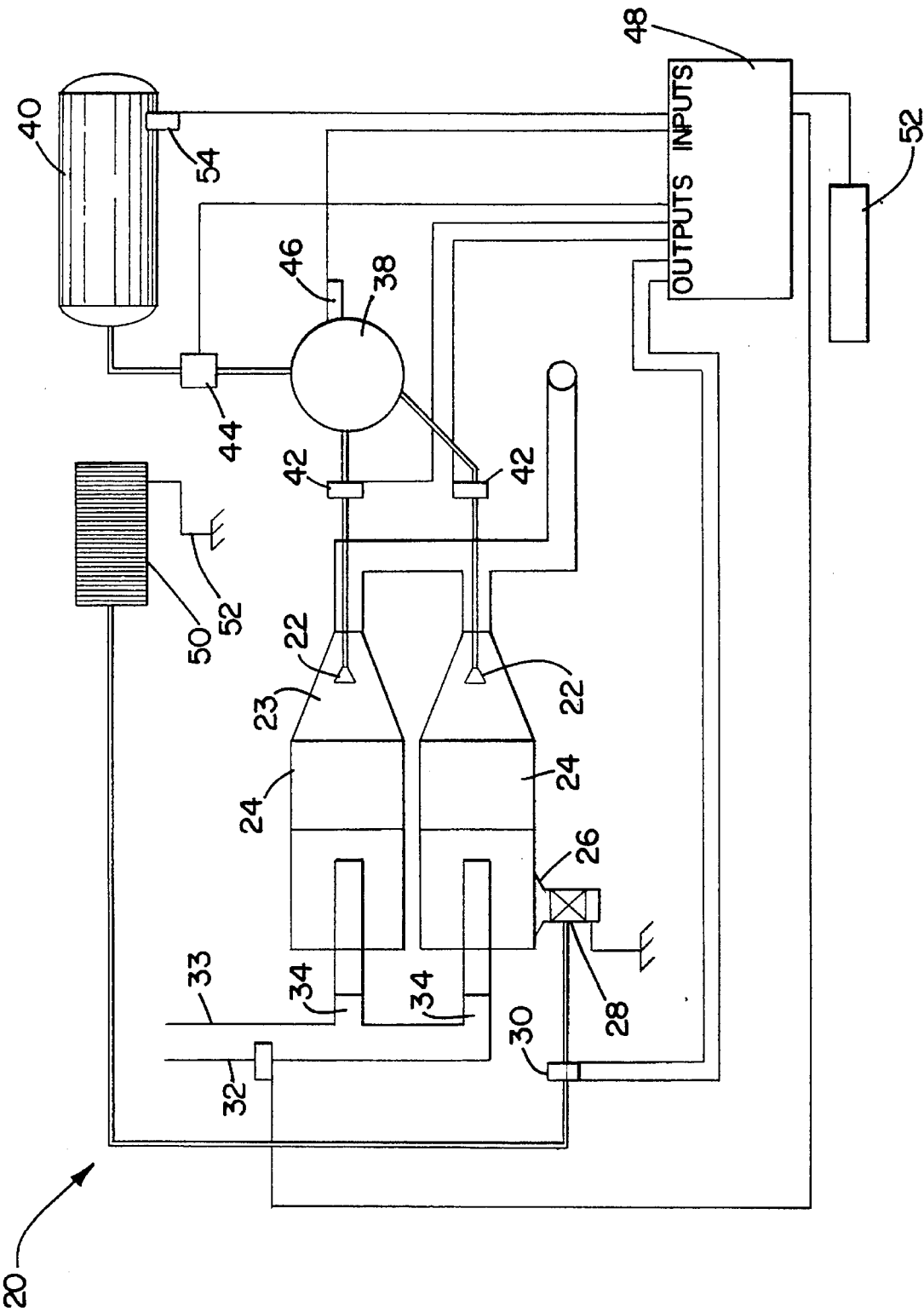
FIG. 1 shows a diagrammatic view of a reverse flow pulse jet apparatus for cleaning exhaust filters, according to the principles of the present invention.

Referring now to the drawings, wherein like reference numerals designate corresponding structure throughout the views, and referring in particular to FIG. 1, there is shown a system for cleaning exhaust filters with a pulse jet, generally designated 20. The pulse jet cleaning system 20 is shown for cleaning one or more filter elements 24. The pulse jet system 20 utilizes reverse air pulses to dislodge particulate collected on the filters 24. It can be appreciated that the pulses must have sufficient energy to overcome the exhaust flow and dislodge the trapped material from the entire area of the filters 24. The system is more effective at low velocity as a high filtration velocity is difficult to overcome with a reverse pulse jet. Once the particles are loosened, they must be captured or disposed of before they are redeposited on the filter and lower velocities afford more time. It has been found that the system 20 is more effective when at least a substantial amount of the operating time is spent with the actual filtration velocity less than 4 feet per minute (1.2 meters per minute). The pulse jet system is even more effective when the actual filtration velocity is 2 feet per minute (0.6 meters per minute) or less. Gravity also aids in directing the loosened soot into a hopper. Lower velocity is required, as the normal exhaust flow must be overcome so that the soot falls into a hopper when loosened before it is redeposited on the filter elements.

In one embodiment, the pulse jet cleaning system 20 utilizes diverter cones 22 disposed in exit chambers 23 associated with each filter for directing pulses of air horizontally through the exit chambers 23 in the direction opposite the normal flow to loosen particulate material trapped on the filter elements 24. Exhaust air normally flows through vehicle exhaust system 33 to exhaust ports 34 leading to the filters 24. The pulses of air loosen the particulate and gravity forces the loosened particles into a hopper 26. The hopper 26 may be equipped with a heater 28 to incinerate the collected soot. The heater 28 includes a heater relay 30 to cycle the heater on and off, if required, and is powered by the vehicle's battery 50.

Air for the pulse jet system 20 is supplied by an accumulator 40, which may be the vehicle's main air tank, or a compressor and is controlled by a valve 44. Air bled from the main accumulator or air tank 40 is stored under pressure in a smaller pulse jet system accumulator 38. The pulse jet system accumulator 38 includes a pressure sensor 46 to measure the pressure build up. The air is released from the accumulator 38 through valves 42 to create reverse pulses of air for cleaning the filters 24, as explained hereinafter. The valves are operated by a controller 48, such as a microprocessor, which receives inputs from various sensors. The valves 42 are opened and closed to pulse air at a rate dependent on a number of variables, including the air pressure in the main tank 40 and jet pulse system tank 38. Although the length of the pulse or series of pulses may be varied, in a preferred method the pulses are less than 250 milliseconds. With the controller 48 monitoring the various pressures and operating the valves 44 and 42, safe levels of pressure may be maintained by the main tank 40. High and low pressure switches open and close the valve 44 to avoid deep drawing the main tank 40. In this manner, sufficient compressed air is always available for the operation of other vehicle systems, such as air brakes.

The pulses are also dependent on the backpressure in the vehicle exhaust system, as measured by sensor 32. Excessive backpressure adversely affects the engine's performance and may cause damage. With the backpressure being monitored, should an unusual build up occur at the filter 24, pulses may be directed at a varied rate to clear the filter.

Figure 2:
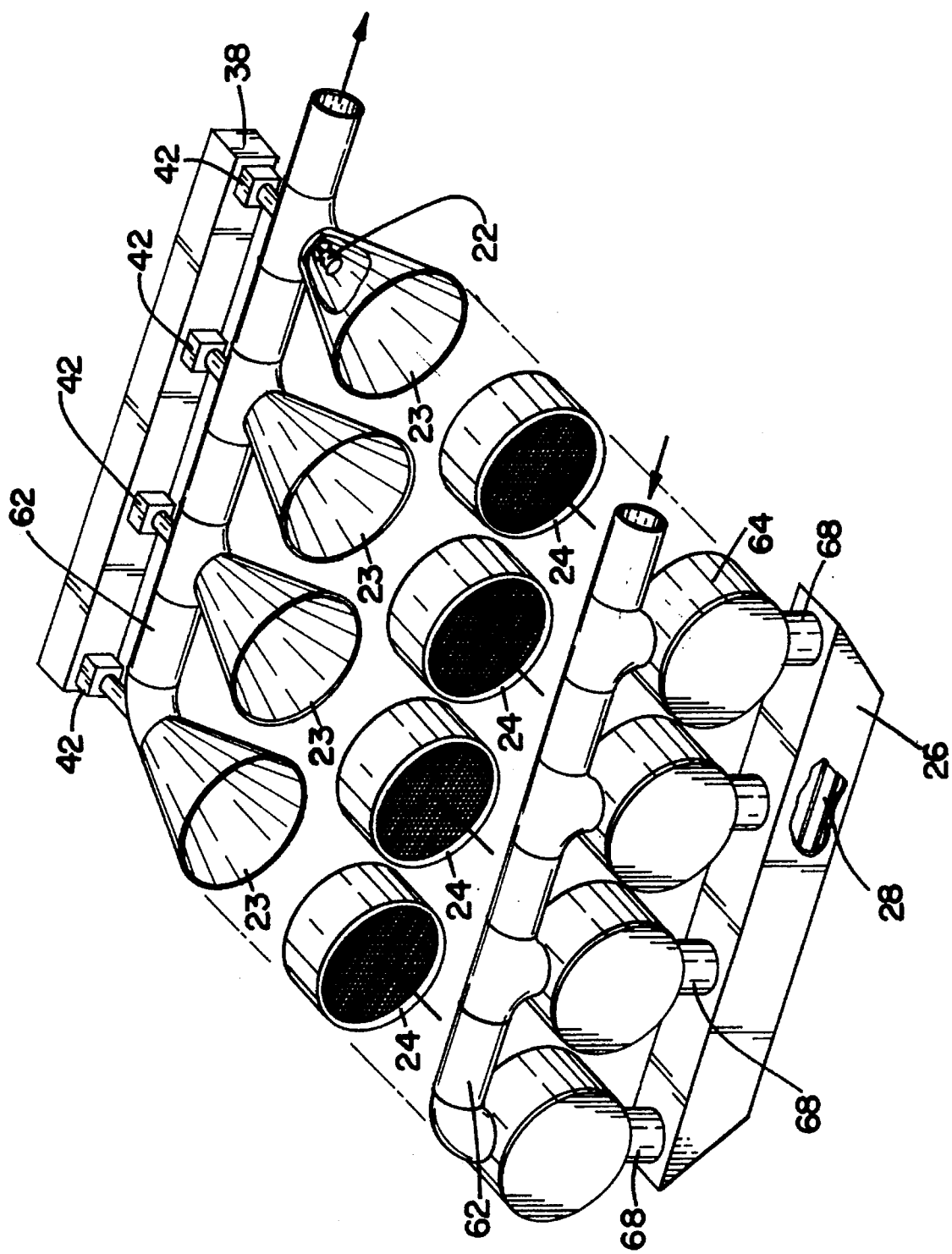
FIG. 2 shows an exploded perspective view of a bank of filters and associated cleaning devices according to the principles of the present invention.

As shown more clearly in FIG. 2, each of the filters 24 has a "honeycomb-like" configuration to filter the exhaust. A ceramic filter with this configuration provides high surface loading levels of diesel soot. It can be appreciated that for some applications, high temperature pleated filters might also be utilized.

The pulse jet cleaner system 20 directs air to the filters 24 through exit chambers 23 having nozzles 58 therein aligned with associated diverter cones 22. The nozzles 58 have a blow tube with a short diverter cone 22 at the end, which fills with the starting vortex of the pulse to decrease mixing and turbulence. The diverter cone 22 acts as a flow spreader to shape and direct air uniformly over the entire area of the downstream side of the filter 24. It has been found that the cone angle should be between 20 and 100 degrees and preferably between 30 and 70 degrees for the most efficient pulse shape. The proper cone angle provides a diverging pulse which directs a pulse over the entire area of the filter 24 with the most energy.

The pulse jet system 20 includes an associated diaphragm valve 42 for each of the nozzles 58. Pressurized air is accumulated in the system accumulator tank 38. The pressurized air is released by the associated valve 42 for each nozzle 58. It has been found that a series of very short pulses, rather than one longer pulse, produces improved loosening with less increase in backpressure. The lower backpressure improves filtering and engine performance.

Figure 3:
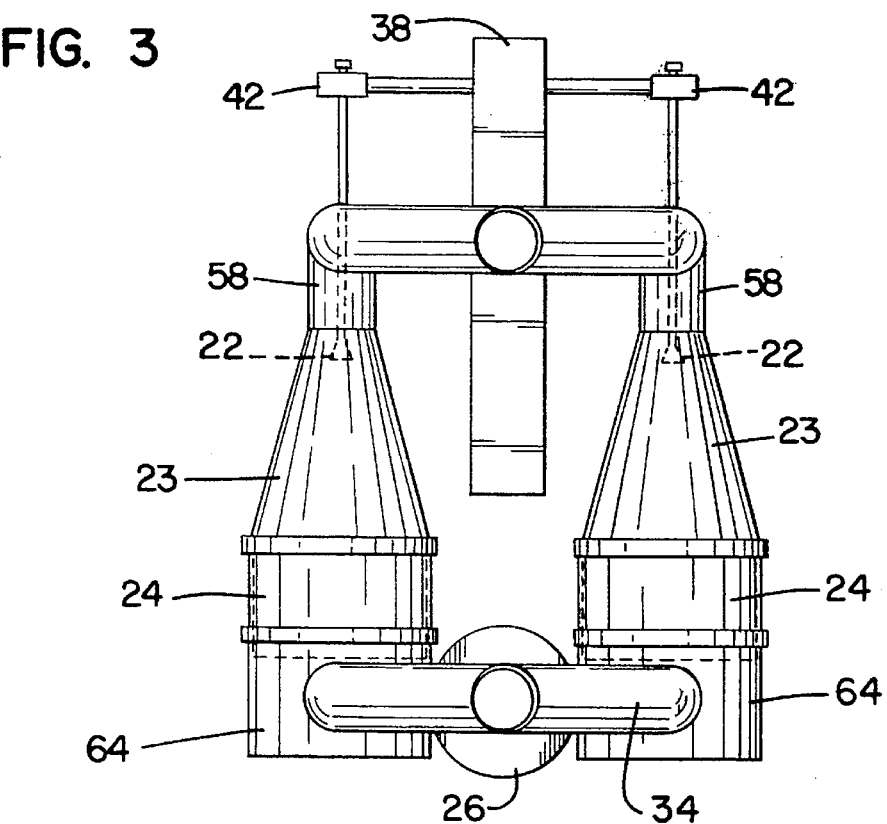
FIG. 3 shows a top plan view of a pair of filters and associated cleaning apparatuses.
Figure 4:
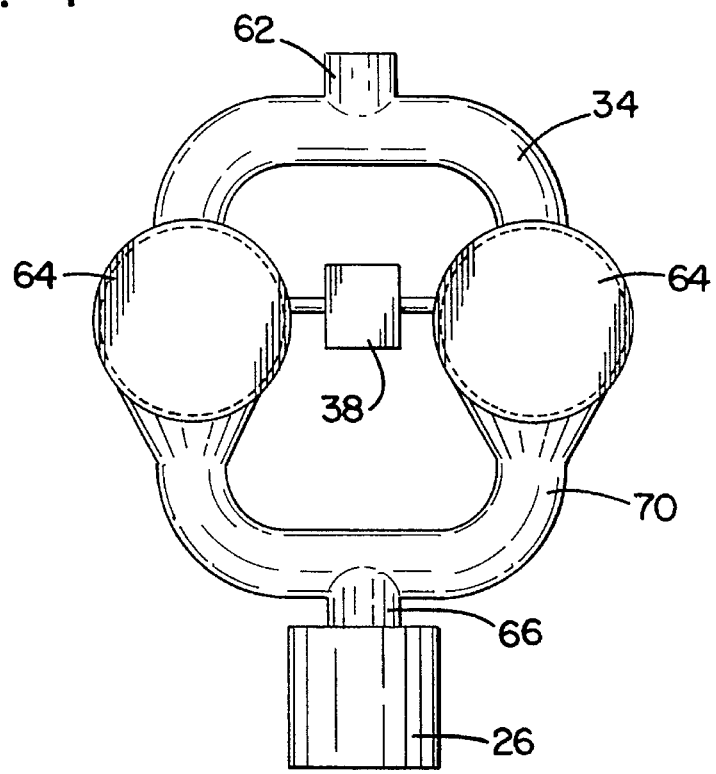
FIG. 4 shows an end elevational view of the filters shown in FIG. 3.
Figure 5:
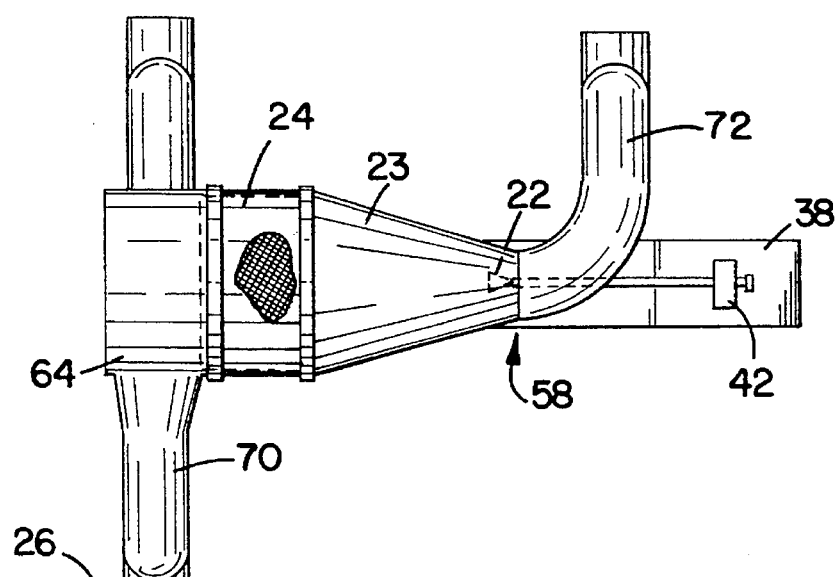
FIG. 5 shows a side elevational view of the filters shown in FIG. 3.

In a preferred embodiment, the filters 24 and associated filter cleaning elements are arranged in pairs, or in greater numbers arranged in banks. The embodiment shown in FIGS. 3–5 includes air filters 24 arranged in pairs. The exhaust ports 34 split to each air filter 24 in a downward sweeping configuration. The exhaust ports 34 lead to chambers 64 horizontally aligned with the filters 24 on the upstream side. A crossover duct 70 leads from the chambers 64 to the hopper 26. The two portions of the hopper crossover duct 70 join to form a single portion 66 to direct soot into the collection hopper 26. The crossover 70 provides a sweeping action of the pulse from both filters 24. The air is also needed for combustion and helps to stabilize temperatures in the hopper 26 from the heater 28. The exhaust ports 34 are aligned directly above the hopper crossover duct 70. In this manner, when a pulse is delivered, the loosened material will drop into the heater hopper 26.

As shown in FIG. 2, a number of filters 24 may be required for an exhaust system. Although four filters 24 and associated pulsing devices are shown, it can be appreciated that a fewer or greater number may also be utilized in a pulse jet cleaning system. The filters 24 are arranged in series with each filter 24 having an associated exit chamber 23, diverter cone 22, nozzle 58, and valve 42. However, a single tank 38 supplies compressed air for pulsing which serves all of the valves 42 and nozzles 58.

An inlet duct 62 includes a branch for each filter 24 and directs the exhaust to a chamber 64 associated with each of the filters 24. A single hopper 26 and heating element 28 are used with an outlet duct 68 leading from each chamber 64 to the hopper 26.

Figure 7:
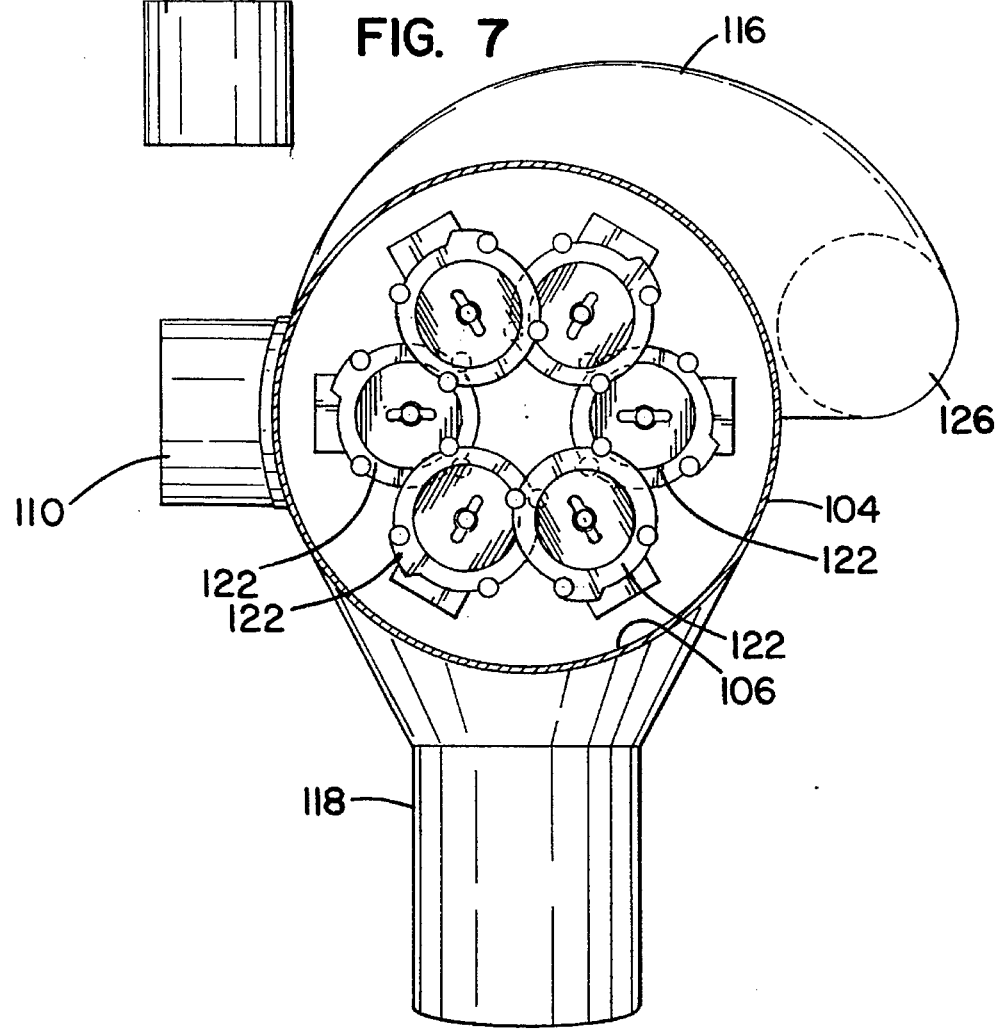
FIG. 7 shows a sectional view of the cleaning apparatus shown in FIG. 6.
Figure 6:
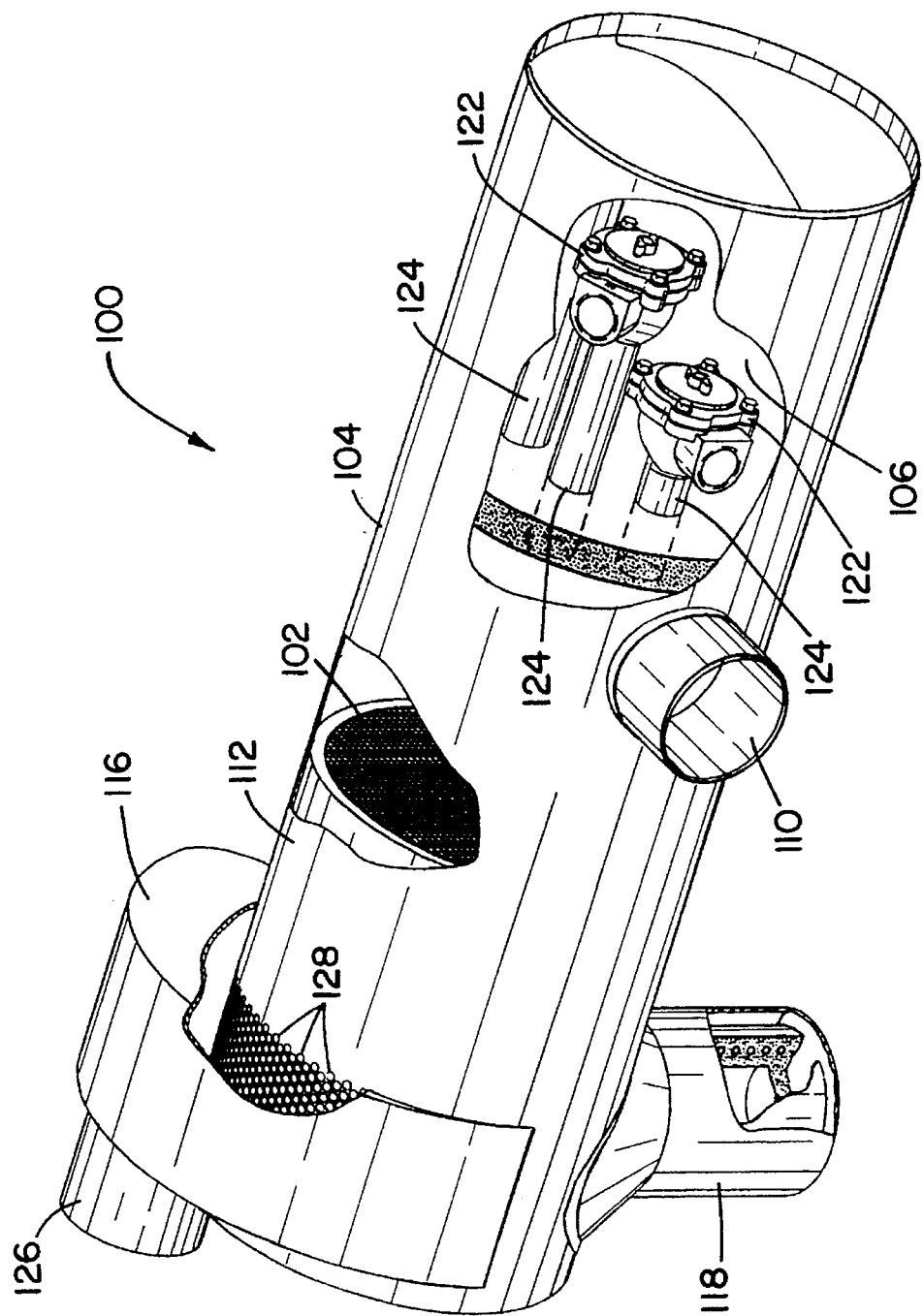
FIG. 6 shows a perspective view of a filter and a second embodiment of an associated cleaning apparatus.

Referring now to FIGS. 6–7, there is shown another embodiment of the pulse jet cleaning system, generally designated 100. In the embodiment shown, a filter element 102 includes a large surface area to be cleaned. In the configuration shown, six valves 122, and blow tubes 124 are used with each filter 102. The blow tubes 124 are positioned in an annular arrangement to provide minimal overlapping while covering the filter surface area.

The exhaust is directed through an inlet 126 to a scroll-shaped distribution chamber 116. The scroll-shaped chamber 116 distributes the exhaust into an inlet chamber 112 upstream from the filter 102. A wall of the inlet chamber 112 includes a perforated screen portion 128 separating the inlet chamber 112 from the scroll-shaped distribution chamber 116. A hopper 118 including a heater is positioned below the inlet chamber 112. The inlet 126 is offset above and to one side of the inlet chamber 112. The scroll-shaped chamber 116 distributes flow from the inlet 126 evenly through the inlet chamber 112 and provides more even flow over the surface of the filter 102. It has been found that the scroll shape provides coverage to over 180 degrees of the inlet chamber 112. The scroll-shaped chamber 116 allows for offset mounting of the inlet 126 for multiple layout configurations which provide uniform distribution. The hopper 118 for the heater is positioned to receive loosened soot and particulate, as explained hereinafter.

Flow proceeds from the inlet chamber 116 through the filter 102 and outlet chamber 104. The filtered exhaust then is directed through outlet duct 110 and exhausted or treated further.

In the embodiment shown in FIGS. 6 and 7, the valves 122 are positioned in an enclosed chamber 106 which acts as an accumulator. The accumulator chamber 106 surrounds the valves 122 and provides a ready supply of compressed air. Air is delivered to the chamber 106 from a main air tank or a compressor. It can be appreciated that each valve 122 is opened to allow the compressed air to flow out the associated blow tube 124. In this manner, all of the valves 122 can be sequentially opened and will direct a pulse of air at the downstream side of the filter 102.

With the arrangement of the valves 122 shown in FIG. 7, the pattern of the pulses will cover virtually the entire area of the filter 102 with very little overlap. With the multiple valves 122 in this arrangement, diverter cones are not required to direct the air pulses, yet adequate coverage of the filter 102 is obtained. The accumulator chamber 106 provides for great savings in space as the chamber houses the valves 122 and associated blow tubes and nozzles 124 while also serving as an air tank. This eliminates the need for both an air tank and a housing for valves, as is required for conventional configurations. The arrangement of the valves 122 also provides complete coverage of the filter while eliminating space required for diverter cones.

In operation, the pulse jet cleaning system 20 is initiated when the ignition 52 is turned on. The ignition 52 also energizes the heater 28 and the controller 48. If the accumulator 38 requires additional pressure, the valve 44 from the vehicle accumulator 40 is opened to provide sufficient compressed air for pulsing. The sensor 32 detects the backpressure and relays the pressure to the controller 48. In addition, the sensors 46 and 54 indicate the pressures in the accumulators, so the controller 48 can determine whether sufficient pressure is available for pulsing. The controller 48 also receives inputs from the engine 52 and computes the proper rates for pulsing to clear material from the filters 24.

If the loosened material is combustible, the heater coil or element 28 will be used and is also operated by the controller 48. The heating element 28 may also be operated continuously to combust the collected material. However, the controller 48 may cycle the heater 28 on and off at a rate dependent on a number of variables, such as engine speed and the pulsing rate. In this manner, the life of the heating element 28 is extended and the power needed is minimized.

It can be appreciated that as the vehicle operating condition varies, for example between high speed and idle conditions, the exhaust flow rate will also vary. Therefor, the pulsing rate needs to varied to matching the operating conditions. The controller 48 monitors the engine operating conditions and adjusts the pulse rate accordingly.

The present invention provides for reverse pulsing without interrupting the exhaust flow. The continuous flow eliminates the need for valving to interrupt the exhaust flow from time to time. The present method of pulsing decreases the build up of backpressure which may decrease performance and/or cause damage to the engine. Continual flow keeps the engine operating, without repeated stopping and starting.

Figure 8:
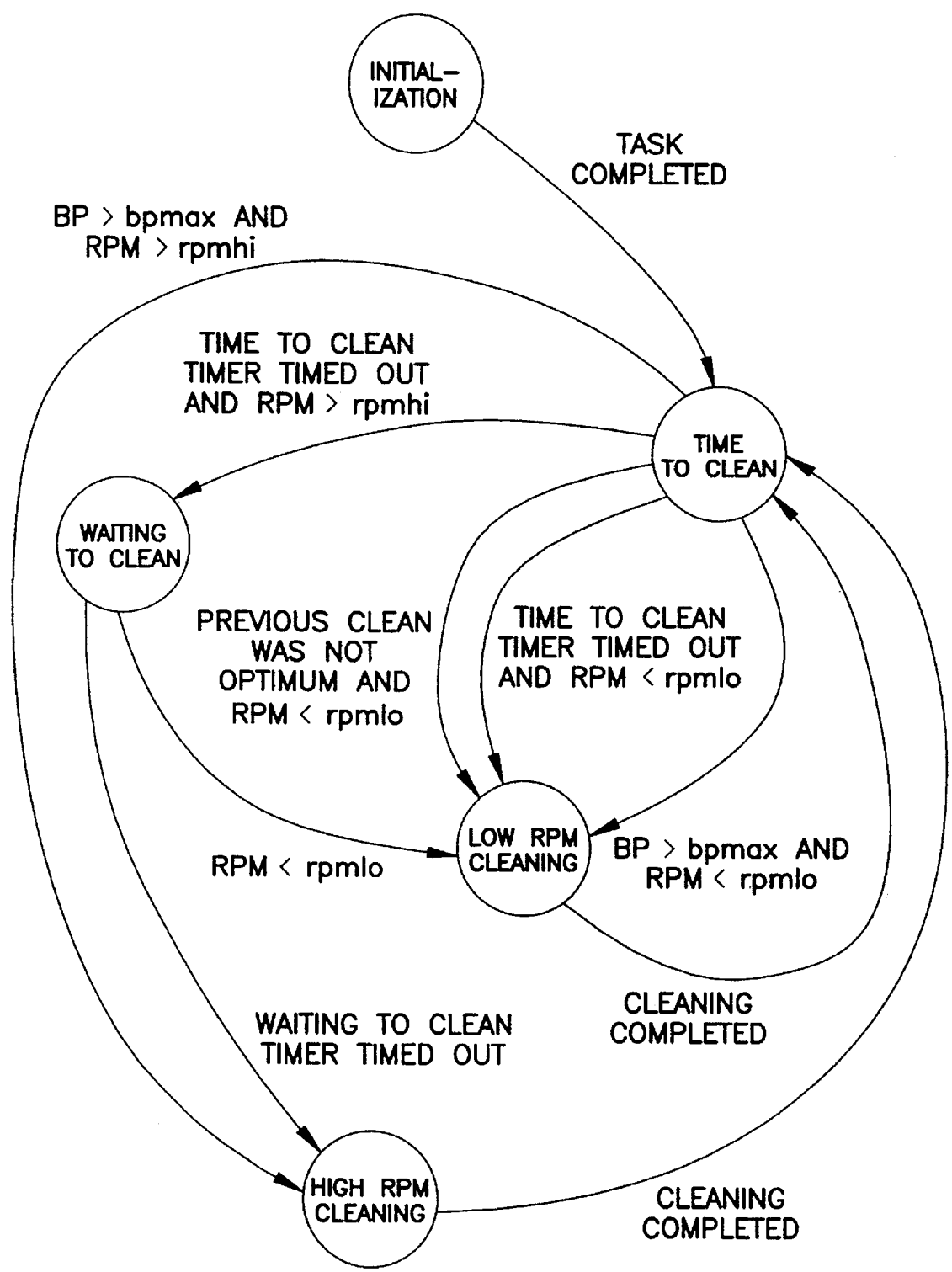
FIG. 8 shows a pulsing logic diagram according to the principles of the present invention.

As shown in FIG. 8, the controller monitors several operating conditions to set the pulsing for the system. The setting of the pulse rate begins when the system is initialized, during which the heater is turned on. The pulsing must occur often enough so that soot cannot build up to an unrecoverable condition, wherein pulsing is no longer able to remove the soot. However, the pulse frequency should not occur too often, as greater energy is used and elements wear more quickly.

Once the system is initialized, pulsing can be adjusted for either high RPM cleaning or low RPM cleaning. The controller uses preselected values based on engine speed to set the limits for high or low RPM settings. Pulsing may be triggered in one of two ways, either by a timer or by a high backpressure condition. For example pulsing is triggered after 30 minutes of engine operation, or after a condition of 3" Hg for 12 seconds. However, time and pressure values may vary depending on the engine and filter arrangements used.

If the engine is sensed to be operating at low RPM, and the backpressure is below the triggering level, pulsing is initiated when the controller timer times out. However, if the engine is operating at low RPM and backpressure is sensed which is above the acceptable level for the predetermined duration, pulsing is also initiated. In addition, if the prior pulsing was not successful, the pulsing will be repeated.

If the engine speed is above the high RPM value, and the timer expires, a second timer is initiated. Since low flow achieves better cleaning, during timing of the second timer, if a low RPM condition is sensed, pulsing is initiated. However, if no low RPM condition is sensed, pulsing is initiated when the second timer expires, regardless of whether low RPM is sensed. It can be appreciated that the high RPM time limit and low RPM time limit may be different. The second timer for high RPM may also have a limit independent of the other timers.

When pulsing is completed, the timers are reset and sensing determines whether a high or low RPM condition exists. The pulsing sequence begins over again and is repeated.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed:

1. A method for cleaning at least two air filters, each filter having an associated horizontal duct portion, having air flow from above the filters and swept down, and through the filters in a substantially horizontal direction, comprising the steps of:
   (a) producing a reverse pulse of air on an outlet side of the filters during continued air flow;
   (b) directing the reverse pulse of air substantially horizontally onto the outlet side of two or more of the filters in a predetermined pattern; and
   (c) sweeping loosened debris from an inlet side of the filter downward to a plurality of horizontal duct portions, and down through a single vertical duct from the plurality of horizontal duct portions and collecting the loosened debris.

2. A method according to claim 1, wherein the air flow continues during the reverse pulse.

3. A method according to claim 1, wherein the pulse of air has a duration of less than 250 milliseconds.

4. A method according to claim 1, wherein the flow has a rate of under 4 actual feet-per-minute through the filter.

5. A method according to claim 1, wherein the predetermined pattern is obtained by directing the air pulse through a diverter cone having an expanding angle in the range of 30–70 degrees.

6. A method according to claim 1, comprising the further step of collecting the loosened debris in a hopper having a heater therein and burning the loosened debris in the hopper.

7. An apparatus for cleaning an air filter, the filter collecting matter on a first side and having air flow pass through the filter to a second side, comprising:
   (a) valve means comprising a pressure vessel accumulating pressurized air, and a plurality of pulsing valves, wherein each of the pulsing valves has a valve body located within the pressure vessel for releasing pressurized air from the pressure vessel to provide pulses of air onto the second side of the filter, and wherein the plurality of valve bodies are spaced at different distances from the second side of the filter;
   (b) means for directing the pulses of air from the plurality of pulsing valves onto the second side of the filter to loosen the collected matter; and,
   (c) hopper means for collecting the loosened matter.

8. An apparatus according to claim 7, further comprising means for combusting the collected loosened matter.

9. An apparatus according to claim 8, wherein the hopper means for collecting the loosened matter comprises a hopper and wherein the means for combusting the collected loosened matter comprises a heater in the hopper.

10. An apparatus according to claim 7, wherein the pulse directing means comprises a plurality of blow tubes, wherein each of the plurality of pulsing valves is associated with one of the blow tubes.

11. An apparatus according to claim 7, wherein the valve bodies are positioned to at least partially overlap in the direction transverse to the second side of the filter.

12. An apparatus for cleaning air filters, the filters collecting matter on a first side and having air flow passing through the filter on a second side, comprising:
   (a) valve means for providing a pulse of air onto the second side of the filter;
   (b) a hopper for collecting loosened matter;
   (c) a crossover duct leading to the first side of least two of the filters, wherein the crossover duct includes a horizontal portion extending from each of the filters joining to form a single substantially vertical portion.

13. An apparatus for cleaning an air filter, the filter collecting matter on a first side and having air flow pass through the filter to a second side, comprising:
   (a) valve means for providing a pulse of air onto the second side of the filter;
   (b) means for directing the pulse of air onto the second side of the filter to loosen the collected matter;
   (c) an air inlet upstream of the filter including an inlet tube offset from a cylindrical inlet chamber, and a scroll-shaped member directing air from the inlet tube to the inlet chamber;
   (d) hopper means on the first side of the filter for collecting the loosened matter; and
   (e) means for combusting the collected loosened matter.

14. An apparatus according to claim 13, wherein the scroll-shaped member disperses flow to the inlet chamber in a pattern covering at least 180 degrees of the inlet chamber.

15. An apparatus for cleaning an air filter, the filter collecting matter on a first side and having air flow pass through the filter to a second side, comprising:
   (a) valve means for providing a pulse of air onto the second side of the filter;
   (b) means for directing the pulse of air onto the second side of the filter to loosen the collected matter;
   (c) an air inlet having a longitudinal direction upstream of the filter including an inlet tube having a longitudinal axis offset from a cylindrical inlet chamber, and a scroll-shaped member arcing between the inlet tube and the air inlet about an axis extending parallel to the longitudinal direction of the air inlet and the inlet tube axis directing air from the inlet tube to the inlet chamber; and
   (d) hopper means on the first side of the filter collecting the loosened matter.

* * * * *